(12) United States Patent
Browne et al.

(10) Patent No.: US 7,296,921 B2
(45) Date of Patent: Nov. 20, 2007

(54) COVERED KITCHEN UTENSIL AND A COVERING FOR A KITCHEN UTENSIL

(75) Inventors: Peter Browne, Aurora (CA); Neal Ho, San Francisco, CA (US)

(73) Assignee: Browne & Co., Markham, Ontario (CA)

(*) Notice: Subject to any disclaimer, the term of this patent is extended or adjusted under 35 U.S.C. 154(b) by 0 days.

(21) Appl. No.: 11/432,496

(22) Filed: May 12, 2006

(65) Prior Publication Data
US 2006/0256644 A1 Nov. 16, 2006

Related U.S. Application Data

(63) Continuation-in-part of application No. 10/937,303, filed on Sep. 10, 2004, now abandoned, which is a continuation of application No. PCT/CA02/01739, filed on Nov. 12, 2002.

(51) Int. Cl.
*A47J 43/10* (2006.01)
(52) U.S. Cl. .................................. 366/129; 416/70 R
(58) Field of Classification Search .............. 366/129, 366/130, 343, 342; 174/119 R, 117 R; 15/141.1, 15/207.2; 428/397, 373; 416/70 R
See application file for complete search history.

(56) References Cited

U.S. PATENT DOCUMENTS

| | | | | |
|---|---|---|---|---|
| 477,388 | A * | 6/1892 | Shaw | 15/141.1 |
| 1,579,382 | A * | 4/1926 | Mitchell | 15/141.1 |
| 3,039,457 | A * | 6/1962 | Boudkevitch et al. | 601/107 |
| 3,286,020 | A | 11/1966 | McLoughlin | |
| 3,368,514 | A | 2/1968 | Kelly | |
| 4,005,893 | A | 2/1977 | Tash | |
| 4,532,919 | A * | 8/1985 | Iwahashi et al. | 601/107 |
| 4,836,688 | A | 6/1989 | Bayly | |
| 4,969,268 | A | 11/1990 | Kelly, III | |
| 5,214,244 | A * | 5/1993 | Cummings et al. | 174/42 |
| 5,367,971 | A * | 11/1994 | Carpenter et al. | 114/243 |
| 6,257,752 | B1 | 7/2001 | Browne | |
| 6,273,602 | B1 | 8/2001 | Steiner et al. | |
| 6,454,456 | B2 | 9/2002 | Browne | |
| 6,596,216 | B2 | 7/2003 | Grisoni | |
| 6,734,365 | B2 * | 5/2004 | Mazzer | 174/121 A |
| 6,865,815 | B1 * | 3/2005 | Dunn et al. | 30/324 |
| 2001/0011602 | A1 * | 8/2001 | Vitolo | 174/117 R |
| 2002/0003749 | A1 * | 1/2002 | Browne | 366/129 |

FOREIGN PATENT DOCUMENTS

| | | |
|---|---|---|
| CH | 170402 | 9/1934 |
| DE | 334 157 | 3/1921 |
| DE | 861 913 | 1/1953 |
| EP | 88303088.4 | 4/1988 |

\* cited by examiner

*Primary Examiner*—Tony G Soohoo
(74) *Attorney, Agent, or Firm*—Gowling Lafleur Henderson LLP

(57) ABSTRACT

A kitchen utensil for contacting at least one of a food and a food-containing surface is provided. The utensil comprises a handle; and, at least one elongate member extending from an end of the handle, the at least one elongate member comprising a resilient covering surrounding a core element, the covering comprising a non-round transverse cross-sectional profile. The kitchen utensil covering may also comprise a longitudinal cross-sectional profile varying along its length. The kitchen utensil transverse cross-sectional profile may also vary along the elongate member's length according to at least one of shape, size and orientation.

20 Claims, 5 Drawing Sheets

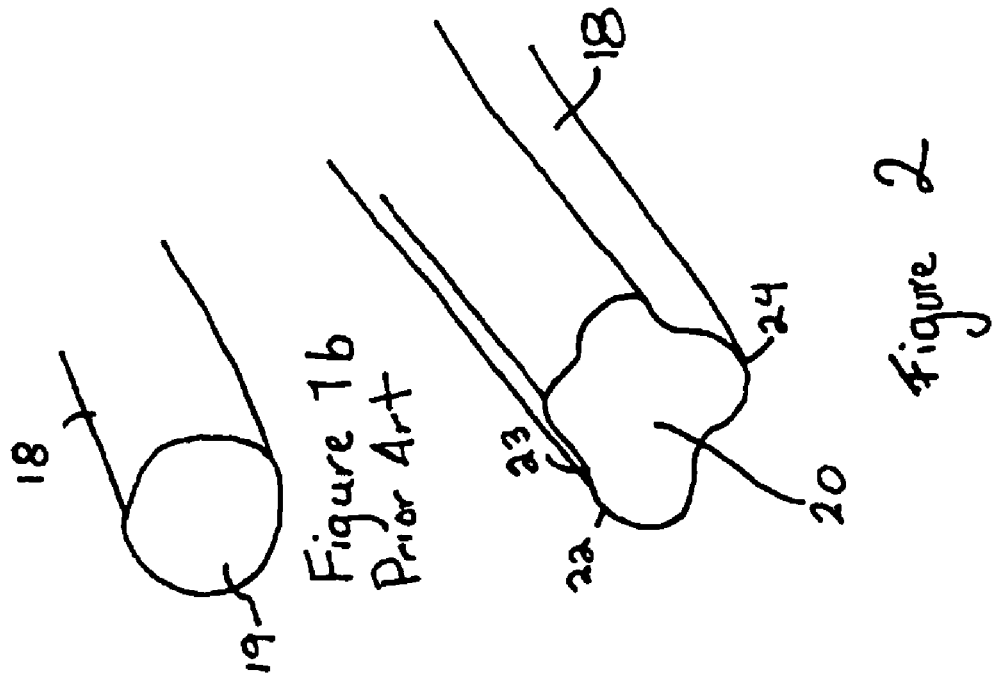
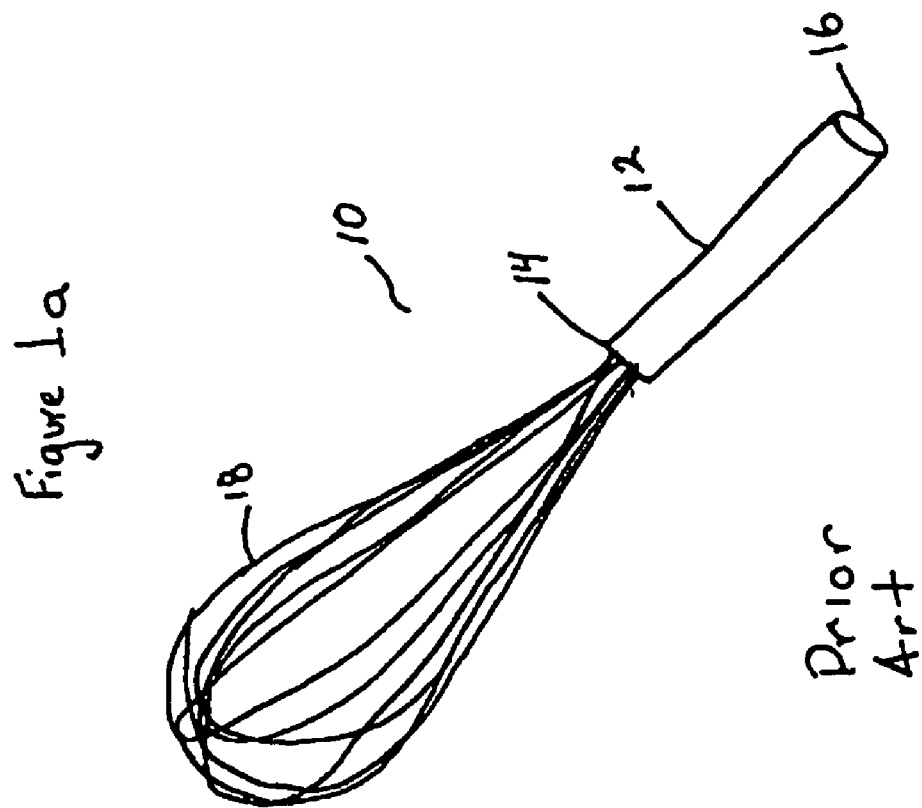

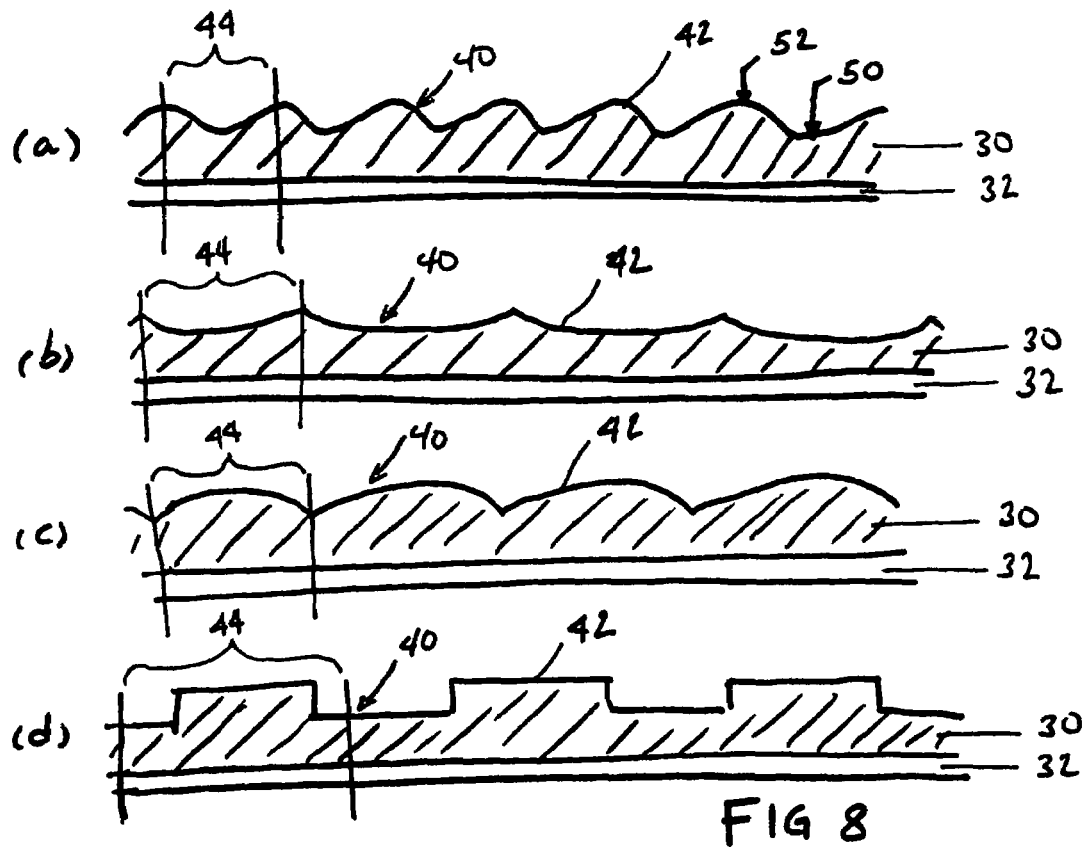
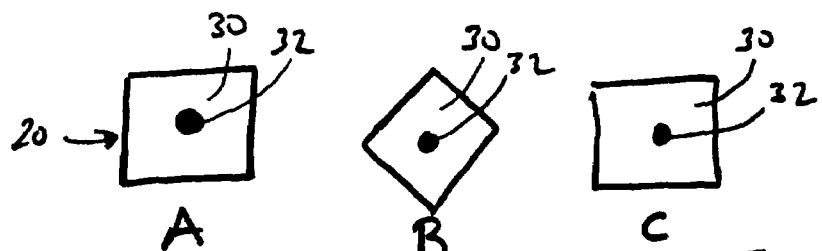
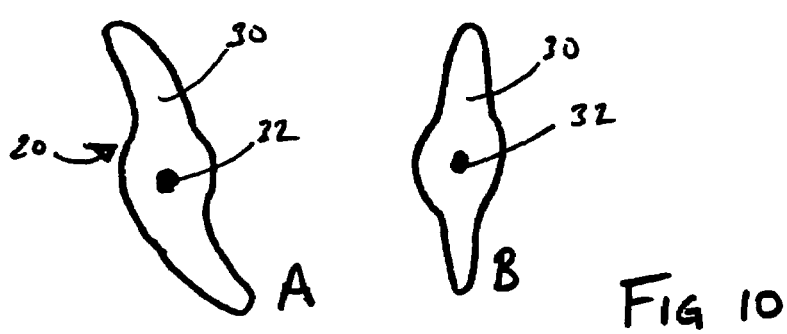
FIG 8
FIG 9
FIG 10

COVERED KITCHEN UTENSIL AND A COVERING FOR A KITCHEN UTENSIL

RELATED APPLICATION

This application is a Continuation in Part of U.S. patent application Ser. No. 10/937,303 filed Sep. 10, 2004 now abandoned which is a Continuation of International Application No. PCT/CA02/01739 filed Nov. 12, 2002.

TECHNICAL FIELD

The present invention relates to a kitchen utensil with a covered elongate member such as a covered whisk.

BACKGROUND OF THE INVENTION

This invention relates to kitchen utensils that are used in contact with food containing surfaces including the surfaces of vessels such as pots and pans, bowls, bottles and jars and other foods and equipment and with food contained within or supported by such surfaces. For example such kitchen utensils include whisks, pastry blenders and cleaning tools. It is often important when using such kitchen utensils that the contact between the utensil and the vessel, or the food contained in the vessel in the case of a whisk or pastry blender, be maximised for efficient and effective use.

Generally such whisks comprises loops, blades, bristles or other elongate members that have a cross-sectional profile that is round. For example, FIG. 1a illustrates a utensil 10, which is a conventional whisk, generally having an array of flexible elongate members 18 (e.g. whisking elements or cleaning elements) connected at an inner end 14 of a handle 12. Other conventional whisk configurations are known to those skilled in the art such as the balloon whisk, flat whisk, and Swedish style helical whisk illustrated in applicant's U.S. Pat. No. 6,257,752 B1 issued Jul. 10, 2001. Additional kitchen utensil configurations such as the ball whisk described in U.S. Pat. No. 6,264,356 B1 issued Jul. 24, 2001 to WMF AG and the stirrer described in U.S. Pat. No. 5,947,595 issued Sep. 7, 1999 to Rösle Metallwarenfabrik GmbH & Co. KG are also known. Another example of a kitchen utensil is a cleaning tool that generally has cleaning elements such as bristles extending from a central body.

Common among the above described kitchen utensils is the round shape of the cross-sectional profile 19 of the elongate members 18 as illustrated in FIG. 1b. The round profile 19 of the elongate members 18 (e.g. whisking elements or cleaning elements) of the kitchen utensils tends to minimize the frictional engagement of the elements and the vessel or food with which the kitchen utensil is being used. As such, for example, most whisks are not well-suited for scraping food from a vessel such as from a mixing bowl to a baking pan. Increased user effort is often required to achieve desired results or more than one utensil may be required when such results are not achievable.

It is therefore desired to provide a kitchen utensil that improves the contact between the utensil and vessel or food within the vessel without the requirement of increasing the effort of the user.

SUMMARY OF THE INVENTION

In one aspect, the invention provides a whisk having an elongate member covered by a resilient material covering having a non-round peripheral cross-sectional shape.

In a further aspect, the elongate member is looped, terminating at the end of the handle.

In a further aspect, the whisk has a plurality of elongate members configured in one of a balloon, flat and helical configuration.

In accordance with another aspect of the invention there is provided a kitchen utensil comprising a handle, at least one wire-like, flexible elongate member. Each elongate member having at least one end secured to the handle, the elongate member having a non-round peripheral cross-sectional shape for contacting at least one of a food and a food containing surface.

Preferably, the elongate member may comprise a thin, flexible element and a covering of resilient material suitable for food processing surrounding each flexible element, the covering having an outer surface having a non-round, cross-sectional shape.

In accordance with a further aspect of the invention, there is provided a kitchen utensil comprising a handle having an inner and an outer end; and at least one wire-like flexible elongate member for contacting at least one of a food and a food containing surface. Each elongate member has at least one end connected to the inner end of the handle defining a cross-sectional shape having a peripheral edge for maximising frictional contact with the at least one of a food and food containing surface.

The kitchen utensil may further comprise the elongate member shaped to conform the interior profile of a vessel to aid with cleaning the vessel.

BRIEF DESCRIPTION OF THE DRAWINGS

Further features and advantages of the present invention will become apparent from the following detailed description, taken in combination with the appended drawings, in which:

FIG. 1a shows a kitchen utensil namely a whisk according to the prior art;

FIG. 1b shows a cross-sectional view of a typical elongate member (i.e. wire loop) of the prior art kitchen utensil of FIG. 1a;

FIG. 2 shows a cross-sectional view of a wire-like elongate member for a kitchen utensil in accordance with the invention;

FIGS. 8(a)-(d) illustrates alternate longitudinal cross sectional views of an elongate member for a kitchen utensil in accordance with a further embodiment of the present invention;

FIG. 9 illustrates transverse cross-sectional views of an elongate member for a kitchen utensil in accordance with a further embodiment of the present invention; and, FIG. 10 illustrates transverse cross-sectional views of an elongate member for a kitchen utensil in accordance with a further embodiment of the present invention.

It will be noted that throughout the appended drawings, like features are identified by like reference numerals.

DETAILED DESCRIPTION OF THE PREFERRED EMBODIMENT

Figure 3A:
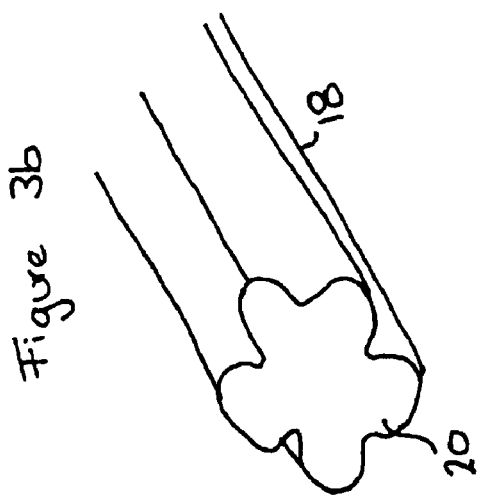
FIG. 3a-d show other embodiments of the cross-section of an elongate member for a kitchen utensil of the present invention.

FIG. 2 illustrates a non-round cross-sectional profile 20 of an elongate member 18 constructed in accordance with the invention for a kitchen utensil such as the whisk 10 of FIG. 1. The general peripheral edge 22 of profile 20 in FIG. 2 is of a varying diameter from the central axis of elongate member 18 and defines a plurality of valleys or recesses 23 and peaks or projections 24 as measured from a notional circumference around member 18 (not shown) determined from its average diameter. The peripheral edge 22 increases the surface area of elongate member 18 relative to a round profile (e.g. profile 19 of FIG. 19) for a similarly sized elongate member 18 thus facilitating increased contact between utensil 10 and any food or surface with which it may be used.

When employed in a whisk configuration for whipping liquids, such a profile 20 adds local turbulence to the liquid and increases air entrainment.

Figure 3B:
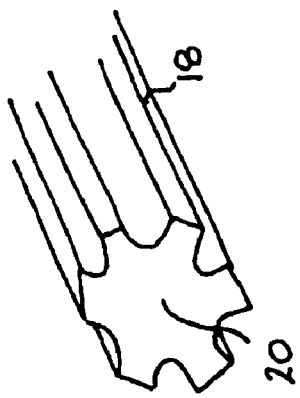
Figure 3C:
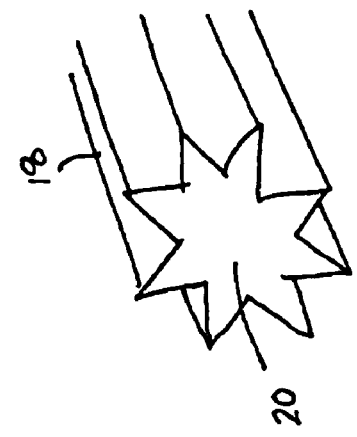
Figure 3D:
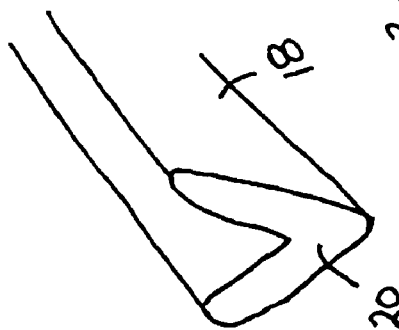

FIGS. 3a-d show different embodiments of the cross-sectional profile 20. FIG. 3a shows a star-like shape. FIG. 3b shows a flower-like shape. FIG. 3c shows a V-shape. FIG. 3d shows a cog shape. Preferably the peripheral edge 22 of the elongate member 18 defines a series of projections and grooves or recesses located around elongate member 18; however, it will be understood that any non-round shape may be used that increases the surface area of elongate member 18 for contact with the food containing surface and/or the food with which utensil 10 is to be used. Additional shapes include rectangular shapes such as a square, a pentagon, a hexagon, etc. It being understood that such regular n-sided equilateral shapes having many edges such that the shape approaches a round shape are less preferred.

Each elongate member 18 is preferably made from a flexible resilient material, preferably metal, plastic, nylon or silicon such as by extrusion/drawing methods understood to those in the art. For kitchen utensils that directly contact food for food preparation, a suitable neutral material should be used such as stainless steel or food-friendly plastics. The degree of flexibility of the elongate member 18 may be chosen according to the intended use of utensil 10. Flexibility may be varied through choice of materials and dimensioning of the cross-section profile 20. For example, the elongate member 18 is preferably flexible enough such that when the whisk 10 is in use, the elongate member 18 flexes in response to the whisking (or whipping) motion, thereby aiding in the whisking operation.

Figure 3E:
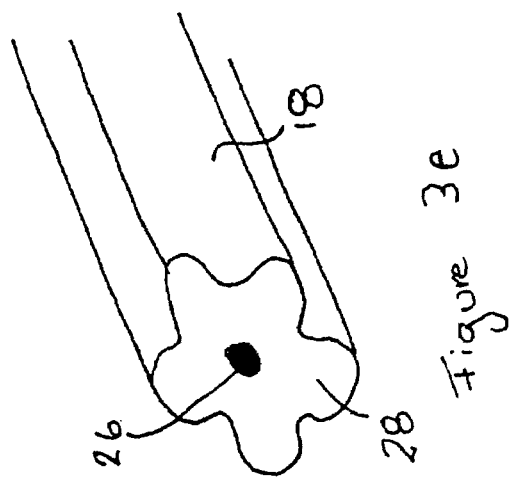
FIG. 3e shows a cross-sectional view of an elongate member having an inner core surrounded by tubing made from a resilient material configured in accordance with the invention.

FIG. 3e shows a further embodiment of elongate member 18 comprising a central core 30, made from a flexible metal (stainless steel), and a surrounding tubing or covering 32, made, for example, from resilient silicon. Also, the use of a covering made from a flexible resilient material increases the diameter of the elongate element 18 without significantly changing the flexibility and spring characteristics of the covered elongate member.

The use of a central core and a surrounding covering has been previously described in U.S. Pat. No. 6,257,752 incorporated herein by reference. At least one of the covering 32 and central core 30 is connected at one or more respective ends thereof to handle 12. Covering 32 may be secured at one or both ends but free to rotate or twist about elongate member 18. Alternatively, the covering 32 may be secured throughout its length to central core 30 such as by adhesive bonding or simply surround central core 30 and is left unsecured while securing at least one end of central core 30 to handle 12. The later alternative is not preferred if the covering 32 is configured relative to central core 30 to permit excessive radial movement of covering 32. Such may negate the increase in frictional contact between elongate member 18 and the food or surface with which it is being used resulting from the non-round profile.

In another embodiment of the invention central core 30 of elongate member 18 can be covered by a resilient material using a molding technique. Each central core 30 is covered individually and later secured to handle 12 as is described above. Also central core 30 can be secured to handle 12 and a covering 32 can be molded on to central core 30 and handle 12.

The performance of whisks having uncoated stainless steel wires and whisks having stainless steel wires with silicon in accordance with the invention were compared. Two whisks having uncoated stainless steel wires and two whisks having stainless steel wires coated with silicon were selected to evaluate their comparative performance. The diameter of the uncoated wires was 0.005" (0.01 cm), and the diameter of the coated wires was 0.095" (0.24 cm). In the test, the coated wires were star-shaped as illustrated in FIG. 3a. The performance of the whisks was evaluated by mixing three raw eggs in identical containers, and then comparing results. The eggs were mixed and observed after 10, 20 and 40 cycles. The result of the testing illustrated that the eggs mixed with the silicon coated whisk appeared more thoroughly mixed after each interval.

It will be understood to those skilled in the art that characteristics of the elongate member may be varied by using materials of varying degrees of flexibility, particularly for a member comprising a central core and tubing. For example, an elongate member constructed from a relatively inflexible core with a tubing exhibiting flexible projections may provide superior cleaning/scraping action to a similar member comprising a more flexible core material. In general, a cleaning tool will be configured to be more rigid that a tool primarily intended for whipping.

Figure 4:
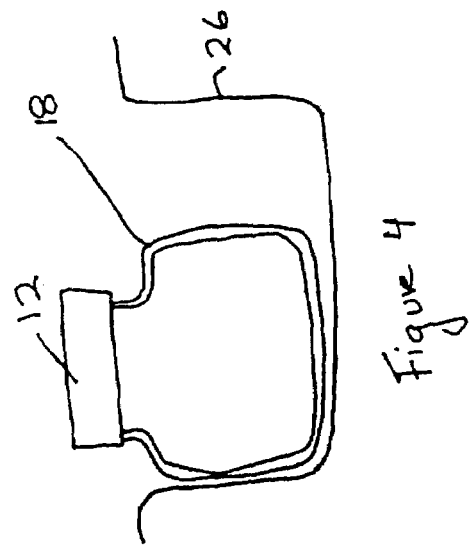
FIG. 4 shows an alternate embodiment of a kitchen utensil with the elongate members of the kitchen utensil configured in accordance with the invention and conforming to the shape of the interior profile of a vessel.
Figure 5:
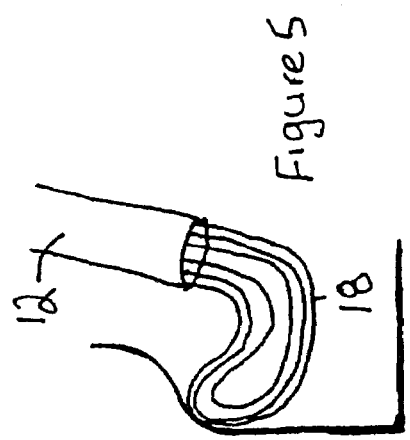
FIG. 5 shows a further alternate embodiment of a kitchen utensil with the elongate members of the kitchen utensil configured in accordance with the invention conforming to the shape of the interior profile of a vessel.

Referring now to FIG. 4, a further embodiment of a kitchen utensil 10 of the present invention is shown. The kitchen utensil 10 comprises a plurality of flexible elongate members 18 shaped to conform to the interior profile of a vessel 26 such as a pot or bowl. It will be understood that the elongate members 18 could be shaped to conform to different shapes depending on the end use requirements. For example, the elongate member 18 could be formed to conform to the interior profile of a bottle, or could be formed into a hook shape to be able to reach inside the corners of different shaped vessels as illustrated in FIG. 5. It will be further understood by a person skilled in the art that the loops will be made of a resilient flexible material that allows for flexibility within the movement of the loops whilst maintaining the contour of the required shape.

Figure 6:
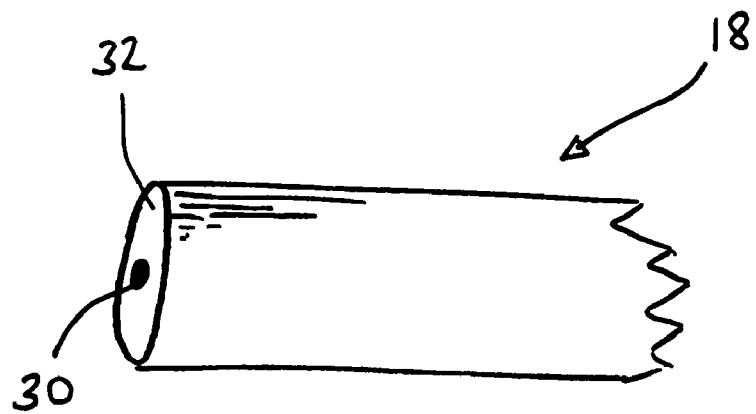
FIG. 6 illustrates a perspective cross-sectional view of an elongate member for a kitchen utensil in accordance with a further embodiment of the present invention.

Referring now to FIG. 6, a perspective cross-sectional view of an elongate member 18 for a kitchen utensil 10 is illustrated in accordance with a further embodiment of the present invention. The elongate member 18 is preferably shaped as a flattened ellipsoid or paddle in cross-section. The degree of to which the elongate member 18 is flattened may be varied according to the whisking requirements of the particular task.

Figure 7:
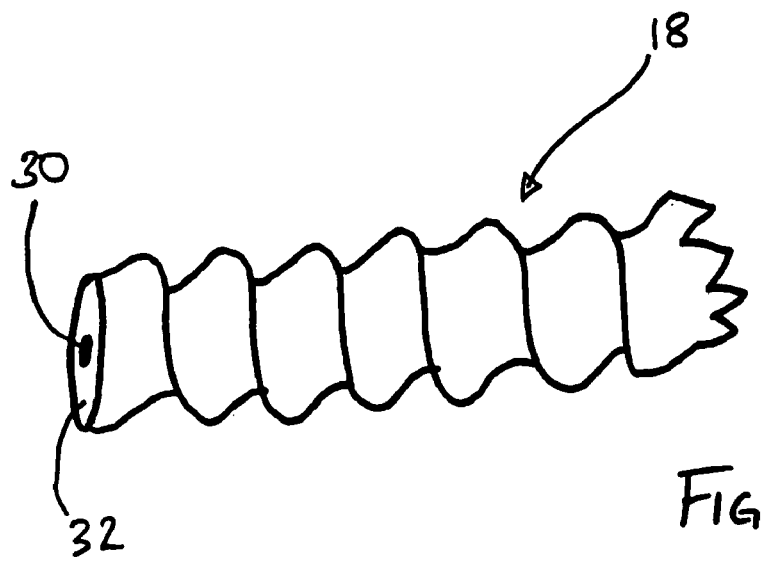
FIG. 7 illustrates a perspective cross-sectional view of an elongate member for a kitchen utensil in accordance with a further embodiment of the present invention.

Referring now to FIG. 7, a perspective cross-sectional view of an elongate member 18 for a kitchen utensil 10 is illustrated in accordance with a further embodiment of the present invention. The elongate member 18 is preferably shaped as a flattened ellipsoid or paddle in cross-section. However, in this embodiment, the paddle shaped elongate member 18 is twisted about its length. The degree of twisting may be varied according to the whisking requirements of the particular task.

Referring to FIGS. 8(a)-(d), the kitchen utensil 10 may alternately be charaterised as comprising the covering 30, which in turn comprises a longitudinal cross-sectional profile 40 that varies along its length. The longitudinal cross-sectional profile 40 comprises opposed profile edges 42, each respective profile edge 42 in turn comprises a series of peaks and troughs (23,24). In a preferred embodiment, the opposed profile edges 42 mirror each other.

In a preferred embodiment the peaks and troughs (23,24) along a length of the respective edge 42 comprises a repeating profile unit 44. The repeating profile 44 unit may be repeated at most a number of times sufficient to span the respective edge 42.

The profile edge 42 may be any one of sinusoidal (FIG. 8(a)), concave scalloped (FIG. 8(b)), convex scalloped (FIG. 8(c)) and dental shapes (FIG. 8(d)). It will be understood that the particular profile edge 42 selected may be varied according to the requirements of the particular task.

Referring to FIGS. 2, 3a-d, 3e, 6, 7, 9 and 10, the kitchen utensil 10 may be characterised as having the transverse cross-sectional profile 20 varying along the elongate member's 18 length according to at least one of shape, size and orientation.

For example, the size of the transverse cross-sectional profile 20 may vary along a length of the covering 32 between a minimum size 50 at one end of the length to a maximum size 52 at the opposite end of the length (see FIG. 8(a) for example). The length preferably comprises a repeating size unit 44. Preferably, the repeating size unit 44 is repeated at most a number of times sufficient to span the covering 32. It will be understood that the particular degree of variance selected may be altered according to the requirements of the particular task.

Referring to FIG. 9, the orientation of the transverse cross-sectional profile 20 may vary along a length of the covering 32 from a starting orientation (A) at one end of the length to an intermediate orientation (B) at an intermediate point along the length and returns to the starting orientation (C) at the opposite end of the length. The length preferably comprises a repeating orientation unit. Preferably, the repeating orientation unit is repeated at most a number of times sufficient to span the covering 32. It will be understood that the particular degree of variance selected may be altered according to the requirements of the particular task.

Referring to FIG. 10, the shape of the transverse cross-sectional profile 20 may vary from a first shape (A) at a first point along a length of the covering 32 to a second shape (B) at a second point along the length. In a preferred embodiment the first point is adjacent the second point. It will be understood that the particular degree of shape shifting selected may be altered according to the requirements of the particular task.

The performances of the whisks 10 of FIGS. 6 (paddle whisk) and 7 (twisted paddle whisk) were independently tested in comparison to the performances of a whisk having silicone coated elongate members (silicone whisk) and a whisk having stainless elongate members (steel whisks). The whisks were tested for efficacy by determining that apparent viscosity of egg whites and whipping cream that were whisked separately using a constant speed of 250 rpm for 0, ½, 1, 1½, 2 and 5 minute increments. A new solution of egg whites and whipping cream was used for each sample. The apparent viscosity was then measured using a viscometer, as in known in the art. The following results were obtained.

| Whisking time (minutes) | Egg White Viscosity (Centipoise) | Whipping Cream Viscosity (Centipoise) |
|---|---|---|
| Twisted paddle whisk | | |
| 0 | 12.5 | 110 |
| 0.5 | 12.5 | 110 |
| 1.0 | 17.5 | 131 |
| 1.5 | 20.0 | 193 |
| 2 | 25.0 | 267 |
| 5 | 25.0 | 11510 |
| Paddle whisk | | |
| 0 | 12.5 | 110 |
| 0.5 | 12.5 | 110 |
| 1.0 | 20.0 | 110 |
| 1.5 | 22.5 | 114 |
| 2 | 22.5 | 129 |
| 5 | 25.0 | 1084 |
| Silicone whisk | | |
| 0 | 12.5 | 110 |
| 0.5 | 12.5 | 110 |
| 1.0 | 15.0 | 110 |
| 1.5 | 17.5 | 115 |
| 2 | 20.0 | 144 |
| 5 | 20.0 | 817 |
| Steel whisk | | |
| 0 | 12.5 | 110 |
| 0.5 | 12.5 | 1110 |
| 1.0 | 15.0 | 110 |
| 1.5 | 20.0 | 116 |
| 2 | 20.0 | 122 |
| 5 | 20.0 | 316 |

The results of testing clearly demonstrate that the paddle and twisted paddle whisks clearly out perform the silicone and steel whisks. This efficiency gain is further illustrated when the relative efficiencies of the respective whisks are compared. For example, when the twisted paddle whisk is taken as being 100% efficient, the following are the percent efficiencies of the other whisks.

| Whisk | 0 (min) | 0.5 (min) | 1.0 (min) | 1.5 (min) | 2.0 (min) | 5.0 (min) |
|---|---|---|---|---|---|---|
| EGG WHITE Percent Efficiency (%) | | | | | | |
| Twisted Paddle | 100 | 100 | 100 | 100 | 100 | 100 |
| Paddle | 100 | 100 | 114 | 113 | 90 | 100 |
| Silicone | 100 | 100 | 86 | 88 | 80 | 80 |
| Steel | 100 | 100 | 86 | 100 | 80 | 80 |

-continued

| Whisk | 0 (min) | 0.5 (min) | 1.0 (min) | 1.5 (min) | 2.0 (min) | 5.0 (min) |
|---|---|---|---|---|---|---|
| | WHIPPING CREAM Percent Efficiency (%) | | | | | |
| Twisted Paddle | 100 | 100 | 100 | 100 | 100 | 100 |
| Paddle | 100 | 100 | 84 | 59 | 48 | 9.4 |
| Silicone | 100 | 100 | 84 | 60 | 54 | 7.1 |
| Steel | 100 | 100 | 84 | 60 | 45 | 2.7 |

The embodiment(s) of the invention described above is(are) intended to be exemplary only. The scope of the invention is therefore intended to be limited solely by the scope of the appended claims.

We claim:

1. A whisk comprising:
 a handle; and,
 at least one elongate member extending from an end of the handle, the at least one elongate member comprising:
  a core element comprising a round transverse cross-sectional shape; and,
  a resilient covering surrounding the core element, the covering comprising a non-round transverse cross-sectional profile such that when the covering surrounds the core element, the elongate member has a transverse cross-sectional shape that differs from that of the core element alone,
 the elongate member further comprising a flexibility sufficient to flex in response to a whisking motion when the whisk in use.

2. A whisk according to claim 1, wherein the covering comprises a longitudinal cross-sectional profile varying along its length.

3. A whisk according to claim 2, wherein the longitudinal cross-sectional profile comprises opposed profile edges, each respective profile edge comprising a series of peaks and troughs.

4. A kitchen utensil according to claim 3, wherein the peaks and troughs along a length of the respective edge comprises a repeating profile unit.

5. A whisk according to claim 4, wherein the repeating profile unit is repeated at most a number of times sufficient to span the respective edge.

6. A whisk according to claim 5, wherein the profile edge is a member selected from the group of sinusoidal, concave scalloped, convex scalloped and dental shapes.

7. A whisk according to claim 6, wherein the opposed profile edges mirror each other.

8. A whisk according to claim 1, wherein the transverse cross-sectional profile varies along the elongate member's length according to at least one of shape, size and orientation.

9. A whisk according to claim 8, wherein the size of the transverse cross-sectional profile varies along a length of the covering between a minimum size at one end of the length to a maximum size at the opposite end of the length.

10. A whisk according to claim 9, wherein the length comprises a repeating size unit.

11. A whisk according to claim 10, wherein the repeating size unit is repeated at most a number of times sufficient to span the covering.

12. A whisk according to claim 8, wherein the orientation of the transverse cross-sectional profile varies along a length of the covering from a starting orientation at one end of the length to an intermediate orientation at an intermediate point along the length and returns to the starting orientation at the opposite end of the length.

13. A whisk according to claim 12, wherein the length comprises a repeating orientation unit.

14. A whisk according to claim 13, wherein the repeating orientation unit is repeated at most a number of times sufficient to span the covering.

15. A whisk according to claim 8, wherein the shape of the transverse cross-sectional profile varies from a first shape at a first point along a length of the covering to a second shape at a second point along the length.

16. A whisk according to claim 15, wherein the first point is adjacent the second point.

17. A whisk according to claim 1, wherein the non-round profile comprises a series of peripheral projections and recesses.

18. A whisk according to claim 17, wherein the non-round shape is selected from the group of elliptical, V, flower, star, square, cog and S shapes.

19. A whisk according to claim 1, wherein the elongate member is looped, terminating at the end of the handle.

20. A whisk according to claim 19, further comprising a plurality of elongate members being configured in one of a balloon, flat and helical configuration.

* * * * *